US012112053B1

(12) United States Patent
Narasappa et al.

(10) Patent No.: US 12,112,053 B1
(45) Date of Patent: Oct. 8, 2024

(54) AUTOMATED MIGRATION OF VIRTUAL VOLUMES BETWEEN STORAGE VIRTUALIZATION APPLIANCES

(71) Applicant: Dell Products L.P., Round Rock, TX (US)

(72) Inventors: Usha B Narasappa, Bengaluru (IN); Koundinya Koorapati, Bengaluru (IN); Sadasivam Shanmugam, Hosur (IN); Atifa Kheel, Bangalore (IN); Ratan Lal, Alwar (IN); Nadimpalli Sunil Kumar Raju, Medchal-Malkajgiri District (IN); Nalluri Sri Varsha, Prakasam District (IN); Yamuna Hanumanthu, Vishakapatnam (IN)

(73) Assignee: Dell Products L.P., Round Rock, TX (US)

(*) Notice: Subject to any disclaimer, the term of this patent is extended or adjusted under 35 U.S.C. 154(b) by 27 days.

(21) Appl. No.: 18/327,985

(22) Filed: Jun. 2, 2023

(51) Int. Cl.
 *G06F 3/06* (2006.01)
(52) U.S. Cl.
 CPC .......... *G06F 3/0647* (2013.01); *G06F 3/0604* (2013.01); *G06F 3/0665* (2013.01); *G06F 3/067* (2013.01)
(58) Field of Classification Search
 None
 See application file for complete search history.

(56) References Cited

U.S. PATENT DOCUMENTS

| 10,404,579 B1* | 9/2019 | Biemueller | ......... H04L 41/0803 |
| 2004/0250021 A1* | 12/2004 | Honda | ................... G06F 3/0689 |
| | | | 711/202 |

OTHER PUBLICATIONS

Dell Technologies, "VPLEX," Data Sheet, H7070.18, Mar. 2023, 3 pages.
Dell EMC, "Dell EMC VPLEX Family," Specification Sheet, H7070.18, Dec. 2016, 4 pages.
Dell EMC, "Dell EMC VPLEX GeoSynchrony," Version 6.2, VPLEX Product Guide, Rev 01, Jan. 2020, 78 pages.
Dell EMC, "Dell EMC VPLEX GeoSynchrony," Version Release 6.2, CLI Reference Guide, Rev 01, Jan. 2020, 562 pages.

(Continued)

*Primary Examiner* — Kevin Verbrugge
(74) *Attorney, Agent, or Firm* — Ryan, Mason & Lewis, LLP

(57) ABSTRACT

An apparatus comprises a processing device configured to select, from a first storage virtualization appliance, virtual volumes to migrate to a second storage virtualization appliance. The processing device is also configured to determine a configuration of first storage elements of the first storage virtualization appliance utilized to implement the selected virtual volumes, and to provision second storage elements for implementing the selected virtual volumes on the second storage virtualization appliance, the second storage elements being provisioned in an inactive state. The processing device is further configured to pause input-output operations directed to the selected virtual volumes on the first storage elements, to modify the first storage elements from an active state to the inactive state and the second storage elements from the inactive state to the active state, and to resume input-output operations directed to the selected virtual volumes on the second storage elements of the second storage virtualization appliance.

20 Claims, 13 Drawing Sheets

(56) References Cited

OTHER PUBLICATIONS

Dell EMC, "Dell EMC VPLEX GeoSynchrony," Version 6.2, Administration Guide, Aug. 2020, 246 pages.
Dell EMC, "VPLEX Overview and General Best Practices," White Paper, H13545, Mar. 2019, 20 pages.
Dell Technologies, "Dell VPLEX Hardware Family," Specification Sheet, H15293.10, Oct. 2022, 5 pages.

* cited by examiner

AUTOMATED MIGRATION OF VIRTUAL VOLUMES BETWEEN STORAGE VIRTUALIZATION APPLIANCES

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for automated migration of virtual volumes between storage virtualization appliances.

In one embodiment, an apparatus comprises at least one processing device comprising a processor coupled to a memory. The at least one processing device is configured to select, from a first storage virtualization appliance, one or more virtual volumes to migrate to a second storage virtualization appliance. The at least one processing device is also configured to determine a configuration of a first set of storage elements of the first storage virtualization appliance utilized to implement the selected one or more virtual volumes, and to provision a second set of storage elements for implementing the selected one or more virtual volumes on the second storage virtualization appliance, the second set of storage elements being provisioned in an inactive state. The at least one processing device is further configured to pause input-output operations directed to the selected one or more virtual volumes on the first set of storage elements of the first storage virtualization appliance, to modify (i) the first set of storage elements of the first storage virtualization appliance from an active state to the inactive state and (ii) the second set of storage elements of the second storage virtualization appliance from the inactive state to the active state, and to resume input-output operations directed to the selected one or more virtual volumes on the second set of storage elements of the second storage virtualization appliance.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
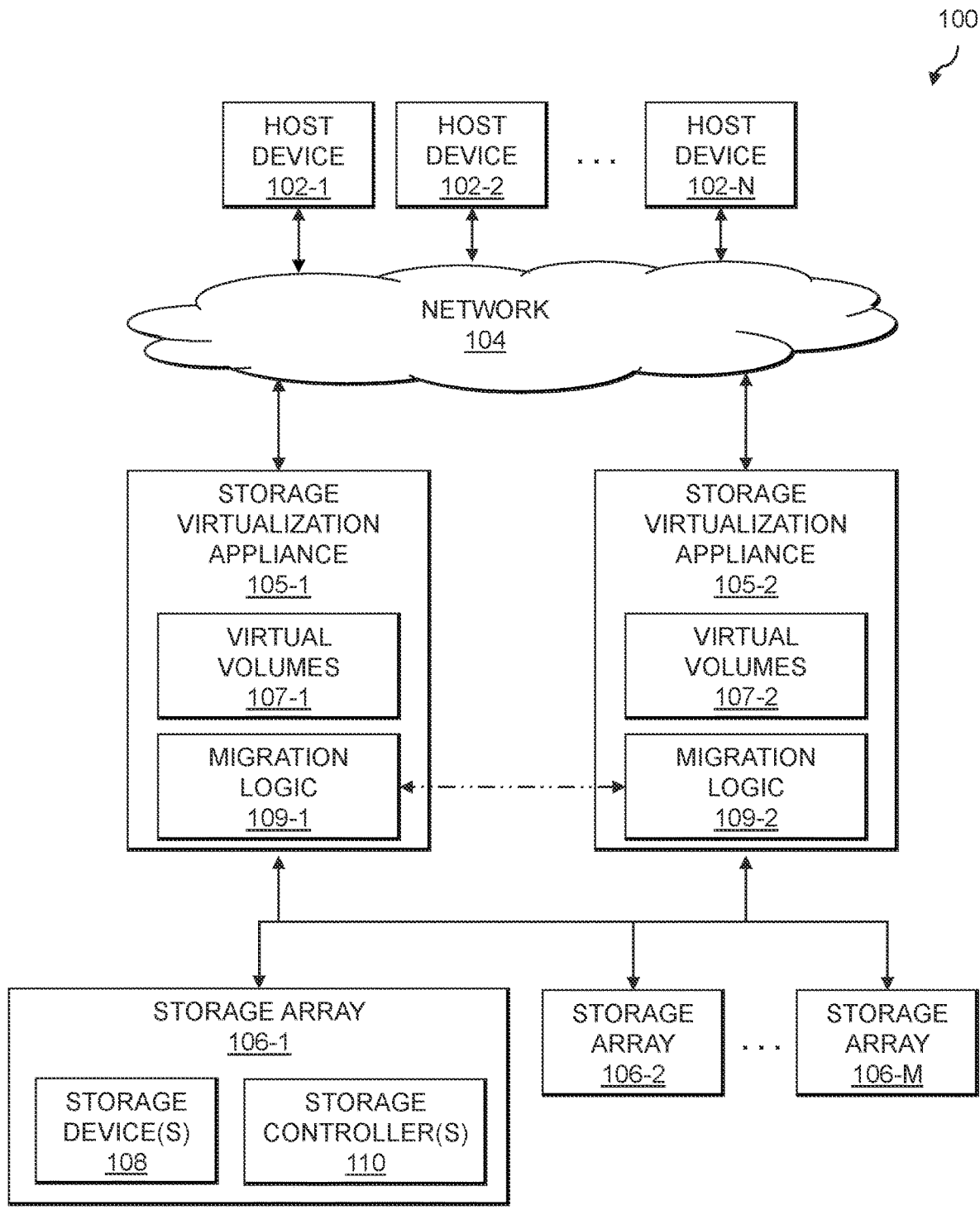
FIG. 1 is a block diagram of an information processing system configured for automated migration of virtual volumes between storage virtualization appliances in an illustrative embodiment.

FIG. 1 shows an information processing system 100 configured in accordance with an illustrative embodiment to provide functionality for automated migration of virtual volumes between storage virtualization appliances. The information processing system 100 comprises one or more host devices 102-1, 102-2 . . . 102-N (collectively, host devices 102) that communicate over a network 104 with one or more storage virtualization appliances 105-1 and 105-2 (collectively, storage virtualization appliances 105) implementing virtual volumes 107-1 and 107-2 (collectively, virtual volumes 107). The virtual volumes 107 provide abstractions of storage from a set of storage arrays 106-1, 106-2 . . . 106-M (collectively, storage arrays 106). The network 104 may comprise a storage area network (SAN) which, although not explicitly shown, may also interconnect the storage virtualization appliances 105 and the storage arrays 106.

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system. In some embodiments, the storage arrays 106 may be part of a storage cluster (e.g., where the storage arrays 106 may be used to implement one or more storage nodes in a cluster storage system comprising a plurality of storage nodes interconnected by one or more networks). In the system 100, the host devices 102 are assumed to submit IO operations to be processed by the storage cluster through accessing one or more of the virtual volumes 107 implemented by one or more of the storage virtualization appliances 105.

The host devices 102 illustratively comprise respective computers, servers or other types of processing devices capable of communicating with the storage virtualization appliances 105 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. Such objects are assumed to be accessed by the host devices 102 via interaction with the virtual volumes 107 of the storage virtualization appliances 105, which in turn interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage virtualization appliances 105 are configured to implement functionality which allows migration among the storage virtualization appliances 105. Such functionality is provided via respective instances of migration logic 109-1 and 109-2 (collectively, migration logic 109) implemented by the storage virtualization appliances 105-1 and 105-2. In some embodiments, "migration" among the storage virtualization appliances 105 includes facilitating non-disruptive upgrade or migration from a "source" storage virtualization appliance (e.g., storage virtualization appliance 105-1) to a "target" storage virtualization appliance (e.g., storage virtualization appliance 105-2). The source storage virtualization appliance may be a legacy virtualization appliance which is to be upgraded (e.g., to a newer version provided by the target virtualization appliance). It should be noted that migration may be done for some or all of the virtual volumes which are implemented by the source storage virtualization appliance, as desired or selected by an end-user (e.g., of one or more of the host devices 102 or another device operated by a storage administrator or other user authorized to perform migration among the storage virtualization appliances).

In some embodiments, the storage arrays 106 in the FIG. 1 embodiment provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

Although in the FIG. 1 embodiment the migration logic 109 is shown as being implemented by both of the storage virtualization appliances 105, this is not a requirement. In some embodiments, only the "target" one of the storage virtualization appliances 105 needs to implement an instance of the migration logic 109. It should be noted, however, that a particular one of the storage virtualization appliances 105 may act as both a source and a target for migration in different migration operations.

At least portions of the functionality of the migration logic 109 may be implemented at least in part in the form of software that is stored in memory and executed by a processor.

The host devices 102, the storage virtualization appliances 105 and the storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage virtualization appliances 105 and the storage arrays 106 may be implemented on respective distinct processing platforms, although numerous other arrangements are possible. For example, in some embodiments at least portions of one or more of the host devices 102, one or more of the storage virtualization appliances 105, and/or one or more of the storage arrays 106 are implemented on the same processing platform. One or more of the storage virtualization appliances 105 and/or one or more the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage virtualization appliances 105 and/or the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102, the storage virtualization appliances, and/or the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage virtualization appliances 105 and the storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage virtualization appliances 105 and the storage arrays 106 may be implemented at least in part in the first geographic location, the second geographic location, and one or more other geographic locations. Thus, it is possible in some implementations of the system 100 for different ones of the host devices 102, the storage virtualization appliances 105 and the storage arrays 106 to reside in different data centers.

Numerous other distributed implementations of the host devices 102, the storage virtualization appliances 105 and the storage arrays 106 are possible. Accordingly, the host devices 102, the storage virtualization appliances 105 and the storage arrays 106 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for automated migration of virtual volumes between storage virtualization appliances is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for automated migration of virtual volumes between storage virtualization appliances will now be described in more detail with reference to the flow diagram of FIG. 2. It is to be understood that this particular process is only an example, and that additional or alternative processes for automated migration of virtual volumes between storage virtualization appliances may be used in other embodiments.

In this embodiment, the process includes steps 200 through 210. These steps are assumed to be performed by one or more of the storage virtualization appliances 105 using the migration logic 109. The process begins with step 200, selecting, from a first storage virtualization appliance, one or more virtual volumes to migrate to a second storage virtualization appliance. The first storage virtualization appliance may utilize a first version of storage virtualization software, and the second storage virtualization appliance may utilize a second version of storage virtualization software different than the first version of storage virtualization software. The selected one or more virtual volumes may comprise all virtual volumes implemented on the first set of storage elements of the first storage virtualization appliance. Health checks may be performed for the first storage virtualization appliance and the second storage virtualization appliance responsive to selecting the one or more virtual volumes to migrate to the second storage virtualization appliance.

In step 202, a configuration of a first set of storage elements of the first storage virtualization appliance utilized to implement the selected one or more virtual volumes is determined. In step 204, a second set of storage elements for implementing the selected one or more virtual volumes on the second storage virtualization appliance are provisioned, the second set of storage elements being provisioned in an inactive state. Step 204 may include zoning the second storage virtualization appliance to a set of host devices configured to access the selected one or more virtual volumes and one or more backend storage arrays providing underlying storage for the selected one or more virtual volumes. Step 204 may also or alternatively include establishing one or more input-output paths between a set of host devices configured to access the selected one or more virtual volumes and the second storage virtualization appliance. Step 204 may further or alternatively include creating one or more virtual volumes on the second set of storage elements having a same virtual product identifier as the selected one or more virtual volumes provisioned on the first set of storage elements of the first storage virtualization appliance.

Step 204 may also or alternatively comprise determining compatibility of the configuration of the first set of storage elements on the first storage virtualization appliance with the second storage virtualization appliance. Determining the compatibility of the configuration of the first set of storage elements on the first storage virtualization appliance may comprise determining one or more Redundant Array of Independent Disks (RAID) types utilized by the selected one or more virtual volumes implemented on the first set of storage elements of the first storage virtualization appliance and, responsive to determining that the selected one or more virtual volumes implemented on the first set of storage elements of the first storage virtualization appliance utilize RAID-0, converting the selected one or more virtual volumes from utilizing RAID-0 to utilizing RAID-1. Determining the compatibility of the configuration of the first set of storage elements on the first storage virtualization appliance may also or alternatively comprise verifying a one-to-one extent to storage volume mapping for the selected one or more virtual volumes and underlying storage on one or more backend storage arrays.

Figure 2:
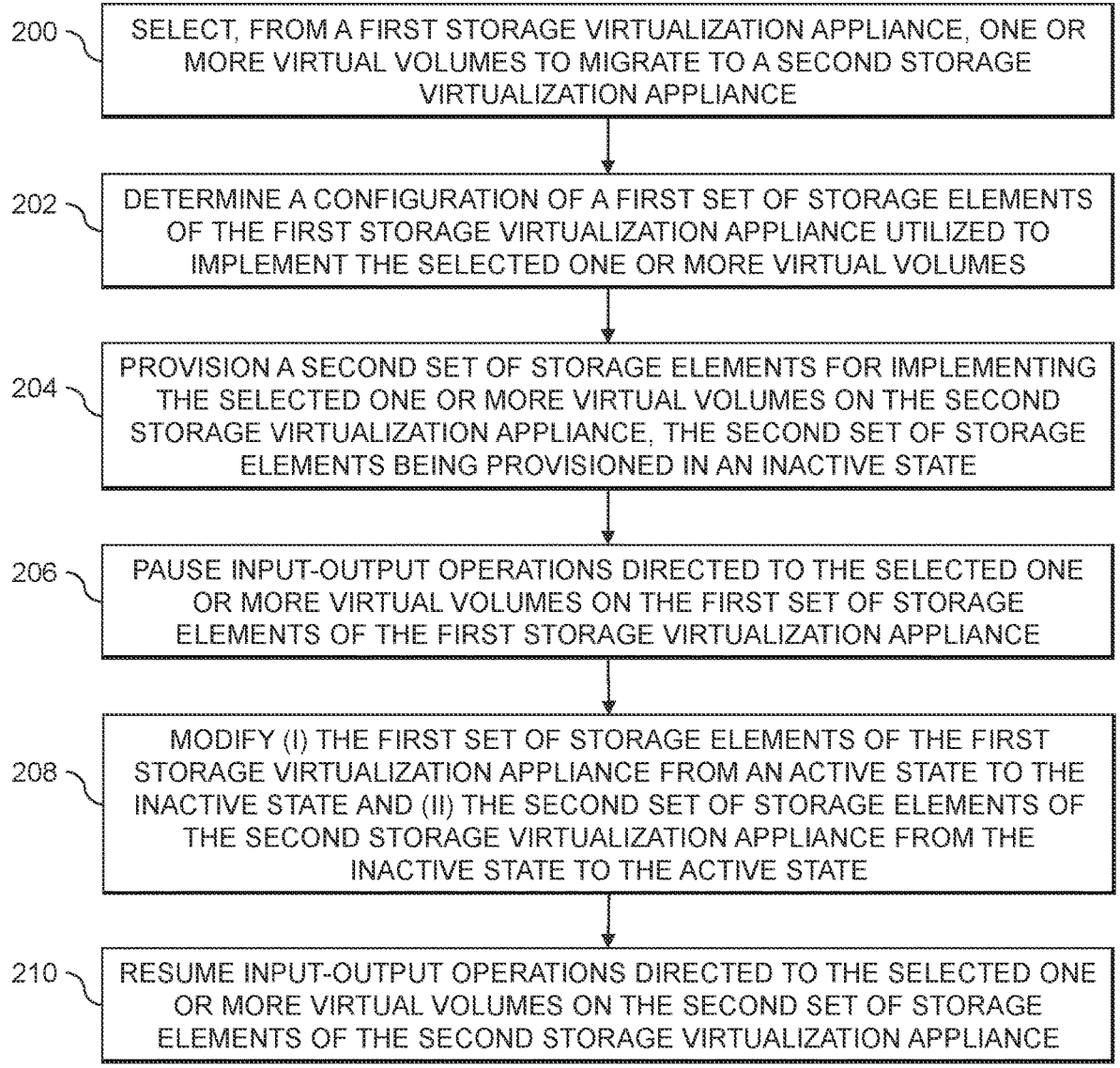
FIG. 2 is a flow diagram of an exemplary process for automated migration of virtual volumes between storage virtualization appliances in an illustrative embodiment.

The FIG. 2 process continues with step 206, pausing input-output operations directed to the selected one or more virtual volumes on the first set of storage elements of the first storage virtualization appliance. In step 208, the first set of storage elements of the first storage virtualization appliance are modified from an active state to the inactive state and the second set of storage elements of the second storage virtualization appliance are modified from the inactive state to the active state. Step 208 may comprise determining one or more Small Computer Systems Interface (SCSI) reservations for the selected one or more virtual volumes on the first storage virtualization appliance, and applying the determined one or more SCSI reservations for the selected one or more virtual volumes on the second storage virtualization appliance. The active state may comprise a ready for input-output state and the inactive state may comprise a not ready for input-output state.

Input-output operations directed to the selected one or more virtual volumes are resumed in step 210 on the second set of storage elements of the second storage virtualization appliance. The FIG. 2 process may further include removing the selected one or more virtual volumes from the first set of storage elements on the first storage virtualization appliance responsive to resuming input-output operations directed to the selected one or more virtual volumes on the second set of storage elements of the second storage virtualization appliance.

Customers or end-users which utilize legacy versions of storage virtualization solutions (e.g., storage virtualization appliances, such as Dell VPLEX®) are faced with challenges when upgrading to newer versions of such storage virtualization solutions. It is generally desired that the entire upgrade or migration process is non-disruptive to the hosts which are serving IO operations from the legacy storage virtualization appliance. The upgrade or migration process, in some cases, may be optional. In other cases, such as where a legacy storage virtualization appliance has been declared end-of-life (EOL) by a vendor thereof, it may be required to upgrade or otherwise migrate the legacy storage virtualization appliance. From the vendor perspective, it is desired to make the upgrade or other migration process seamless and non-disruptive, to retain customer "stickiness" with that vendor's offerings. Illustrative embodiments provide technical solutions that enable customers or other end-users to move from a source (e.g., legacy) storage virtualization appliance to a target (e.g., newer) storage virtualization appliance configuration without any downtime. Conventional processes for such migration are extremely cumbersome, as such conventional processes are highly manual processes which are prone to human errors.

The implementation of generational upgrades for storage virtualization solutions may conventionally be implemented through an iterative "director/node swap" methodology where storage directors or other nodes for the new/target platform assume the identity of the existing storage directors or other nodes for the legacy/source platform, which are sequentially powered off, un-cabled and replaced with new hardware. Such conventional approaches also require that the new and legacy platforms are interconnected using expansion slots found on the storage directors, which presents various technical problems and challenges. Such technical problems include inevitable problems with cabling and zoning, which are only discovered when the conventional approach fails to upgrade. The technical problems with conventional approaches also include that failure recovery is extremely difficult, requiring direct subject matter expert (SME) investigation and correction. Thus, the conventional approaches require professional service engagement, and often require electrical engineering support. The written procedures to be followed by human actors performing the conventional processes are also long and complicated, leading to human error as it requires many manual interventions during the procedure. Further, the code supporting such procedures is large and complicated, leading to difficulty finding and fixing defects. Automated testing with conventional approaches is also very difficult, as the number of system configurations requiring testing is very large. This results in testing gaps and defects, which are hard to fix and also hard to test or verify. Conventional approaches also suffer in that they are generally one-shot operations, where the upgrade of a cluster needs to be accomplished within one maintenance window (e.g., including all necessary cabling changes and pre-checks).

The technical solutions described herein provide a fully automated framework for migrating storage virtualization appliances (e.g., from legacy to newer platforms). The technical solutions advantageously fully automate the workflow, utilize an out-of-band approach, and leverage Representational State Transfer (REST) or other application programming interfaces (APIs) of the storage virtualization appliances. Migration may be performed at the storage view level for each virtual volume in the storage view. The fully automated framework may include a pre-check phase, a configuration preparation phase, a cutover phase, a post-check phase, and a post-migration phase.

The pre-check phase may include performing various pre-checks, such as: checking if the destination or target storage virtualization appliance is seeing all paths to the hosts and backend storage arrays (e.g., where hosts are currently performing IO operations to virtual volumes provisioned from the legacy or source storage virtualization appliance); and checking if the legacy or source storage virtualization appliance has volume types which are not supported by the destination or target storage virtualization appliance (e.g., the destination or target storage virtualization appliance, for example, may only support Redundant Array of Independent Disks (RAID)-1 devices and thus, as a precondition, all RAID-0 devices on the legacy or source storage virtualization appliance to be migrated are converted to RAID-1 devices, with the same being true for RAID-C devices as well).

The configuration preparation phase may include locking the legacy or source storage virtualization appliance, to avoid any configuration changes thereof. REST APIs may be used to get storage views, a virtual volume hierarchy, and logical unit identifiers (LUIDs) from the legacy or source storage virtualization appliance. The entire software configuration present on the legacy or source storage virtualization appliance, such as the storage views, virtual volumes, consistency groups, registered initiator ports, etc., is recreated on the destination or target storage virtualization appliance using interfaces exposed as REST API endpoints. The virtual volumes serving IOs through the legacy or source storage virtualization appliance are re-created using the REST APIs in such a way that the LUID of a given virtual volume remains the same on the destination or target storage virtualization appliance. Due to this, the host devices will be able to see additional paths to the same virtual volume from the destination or target storage virtualization appliance. These additional paths would be visible to the host devices, but are not in an IO-able condition to avoid IOs from the legacy or source storage virtualization appliance and the destination or target storage virtualization appliance happening at the same time.

The cutover phase includes performing a cutover operation, which is performed at the volume level for each virtual volume in the storage view. IOs from the host devices are suspended on the legacy or source storage virtualization appliance for a given virtual volume. SCSI reservations/registrations (e.g., SCSI2, SCSI3, Group) present on the virtual volume on the legacy or source storage virtualization appliance are also migrated to the virtual volume on the destination or target storage virtualization appliance using REST APIs. On the destination or target storage virtualization appliance, the given virtual volume is now made IO-able, which means that IOs from the host devices will now be serviced through the paths from the destination or target storage virtualization appliance.

In the post-check phase, after migration of a storage view is completed, health checks are performed.

In the post-migration phase, the configuration of the legacy or source storage virtualization appliance may be dismantled after all the virtual volumes in the selected storage views are migrated.

Figure 3A:
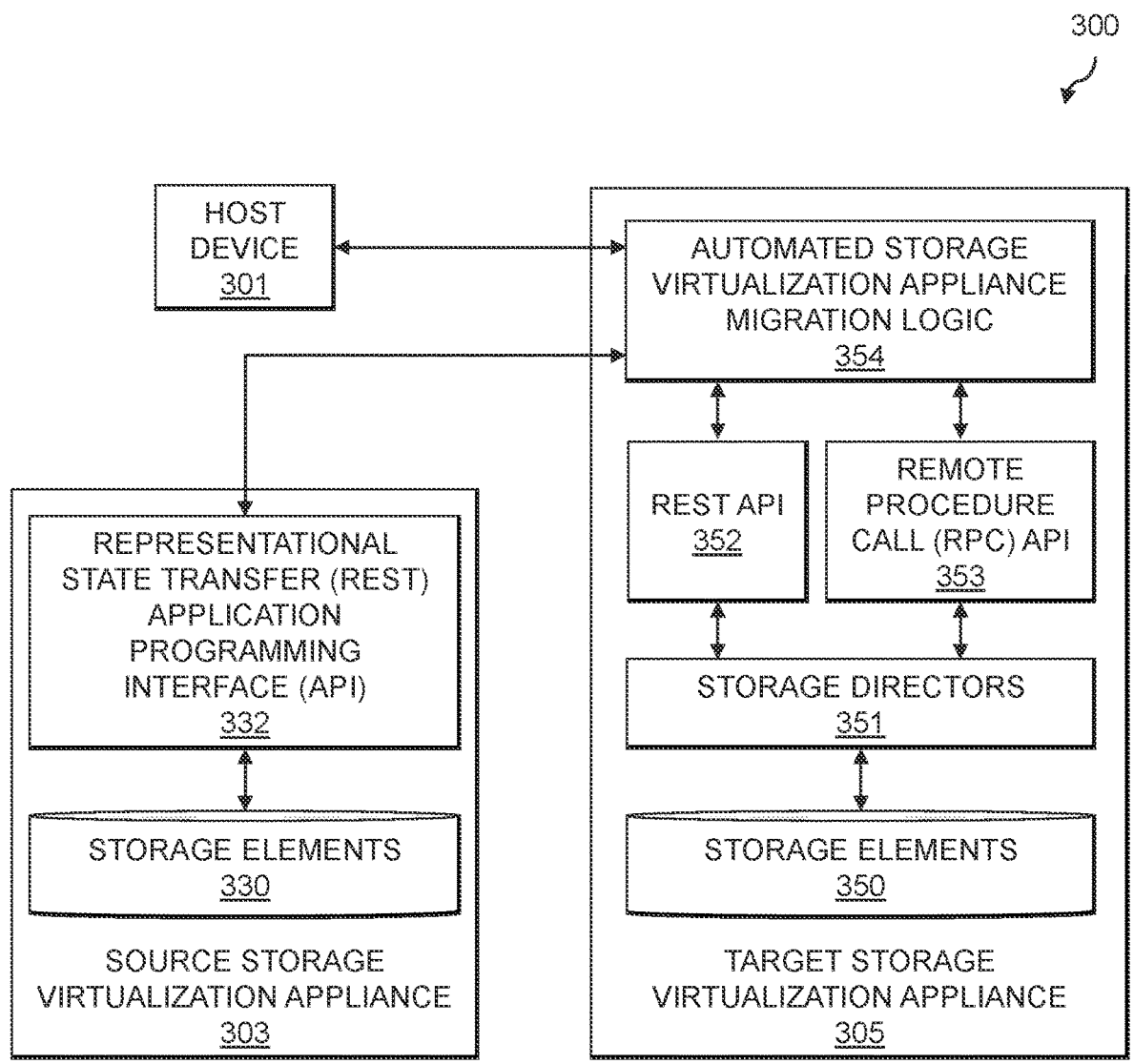
FIGS. 3A-3C show a process flow for migration between source and target storage virtualization appliances in an illustrative embodiment.

FIG. 3A shows a system 300, including a host device 301, a source storage virtualization appliance 303, and a target storage virtualization appliance 305. The source storage virtualization appliance 303 includes a set of storage elements 330 (e.g., storage views each with one or more virtual volumes) and a REST API 332. The target storage virtualization appliance 305 includes a set of storage elements 350 (e.g., storage views each with one or more virtual volumes), one or more storage directors 351, a REST API 352, a remote procedure call (RPC) API 353, and automated storage virtualization appliance migration logic 354. It should be noted that, in some cases, the target storage virtualization appliance 305 may include only the REST API 352 or only the RPC API 353.

Figure 3B:
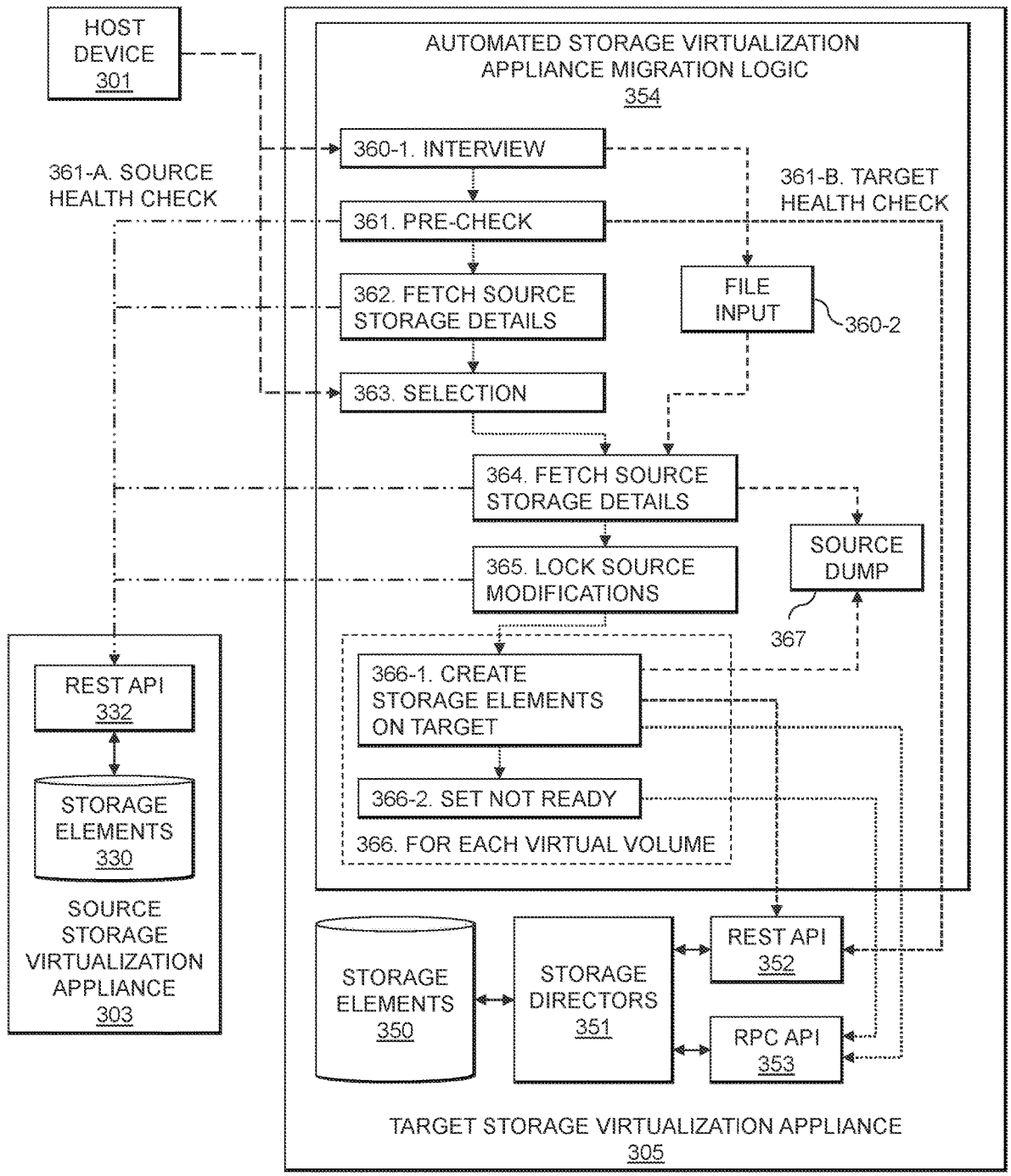

FIG. 3B shows a process for replicating a configuration of the source storage virtualization appliance 303 to the target storage virtualization appliance 305, which may be implemented utilizing the automated storage virtualization appliance migration logic 354. This process begins with an interview step 360-1, where a user of the host device 301 provides address and credential information for the source storage virtualization appliance 303. The address and credential information may include a source IP address for the source storage virtualization appliance 303, a username and password, etc. The interview step 360-1 may also include the user of the host device 301 providing file inputs (e.g., file input 360-2). Pre-checks are performed in step 361. The pre-checks may include a source health check in step 361-A (e.g., performed through accessing the REST API 332 of the source storage virtualization appliance 303), and a target health check 361-B (performed through accessing the REST API 352 of the target storage virtualization appliance 305). The target health check 361-B may include target health and target meta-volume checks.

In step 362, source storage details are fetched (e.g., using the REST API 332). In step 363, selection is performed through interaction with the host device 301 (e.g., specification of storage views to be migrated, etc.). The file input 360-2 and selections from step 363 are used in step 364 to fetch the source storage details (e.g., for the storage views to be migrated). This may involve or utilize the REST API 332 of the source storage virtualization appliance 303. In step 365, source modifications on the source storage virtualization appliance 303 are locked. The process then enters processing loop 366, which is performed for each virtual volume of the storage views that are to be migrated. In step 366-1 storage elements for a given virtual volume are created on the target storage virtualization appliance 305. This may involve use of the REST API 352 and/or the RPC API 353, and may also include checks of backend storage array status for the backend storage arrays providing the underlying physical storage for the given virtual volume. In step 366-2, the created storage elements are set as not ready. This may also involve use of the RPC API 353. It should be noted that, as a prerequisite to the process shown in FIG. 3B, both the source storage virtualization appliance 303 and the target storage virtualization appliance 305 should be zoned to the same hosts and backend storage arrays. Following steps 364 and 366-1, a source dump operation may be performed in step 367.

Figure 3C:
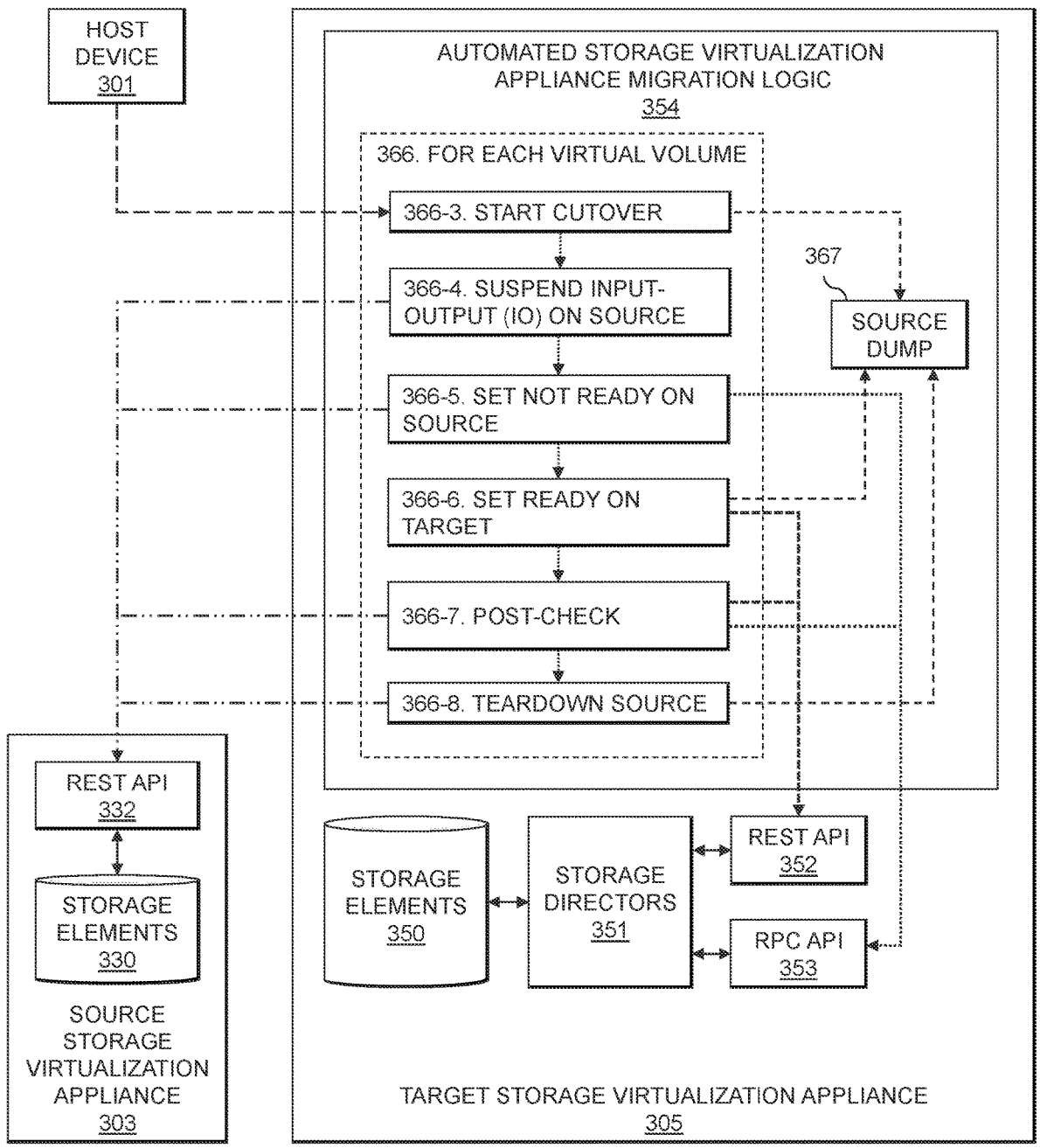

FIG. 3C shows a process for cutover from the source storage virtualization appliance 303 to the target storage virtualization appliance 305, which may be implemented utilizing the automated storage virtualization appliance migration logic 354. This continues the processing loop 366, performed for each virtual volume as noted above. In step 366-3, cutover is started (e.g., initiated by a user of the host device 301). IO on the source storage virtualization appliance 303 is suspended in step 366-4 (e.g., using the REST API 332). In step 366-5, the source storage virtualization appliance virtual volume is set not ready (e.g., using the REST API 332). In step 366-6, the virtual volume on the target storage virtualization appliance 305 is set as ready (e.g., using one or both of the REST API 352 and the RPC API 353). Post-checks are performed in step 366-7 (e.g., on the source storage virtualization appliance 303 using the REST API 332, and on the target storage virtualization appliance 305 using the REST API 352 and/or the RPC API 353). The virtual volume on the source storage virtualization appliance 303 is torn down in step 366-8, using the REST API 332. Source dump operations may be performed in step 367 following steps 366-3, 366-6 and 366-8.

Figure 4A:
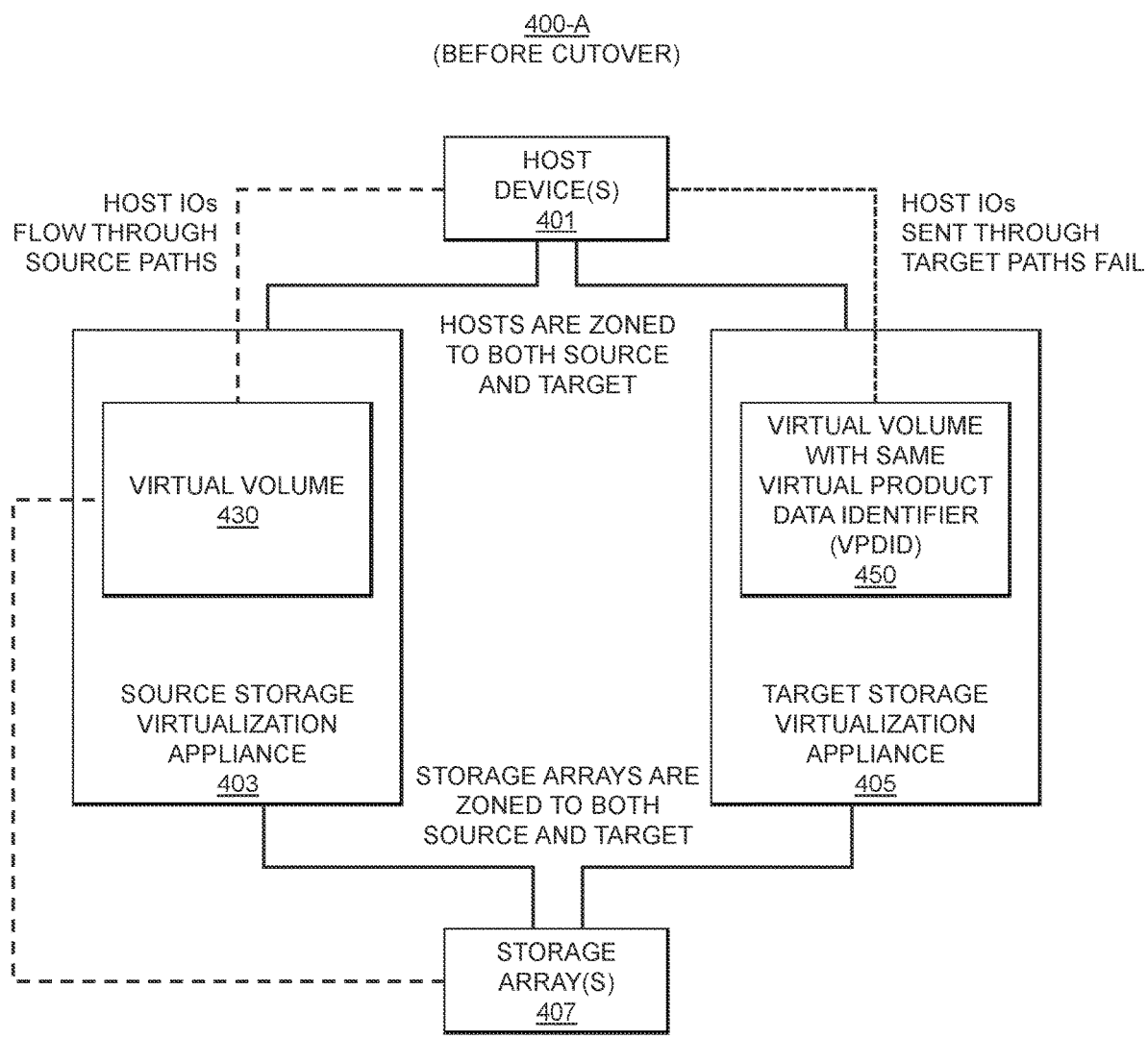
FIGS. 4A and 4B show input-output processing before and after cutover from a source to a target virtualization appliance in an illustrative embodiment.
Figure 4B:
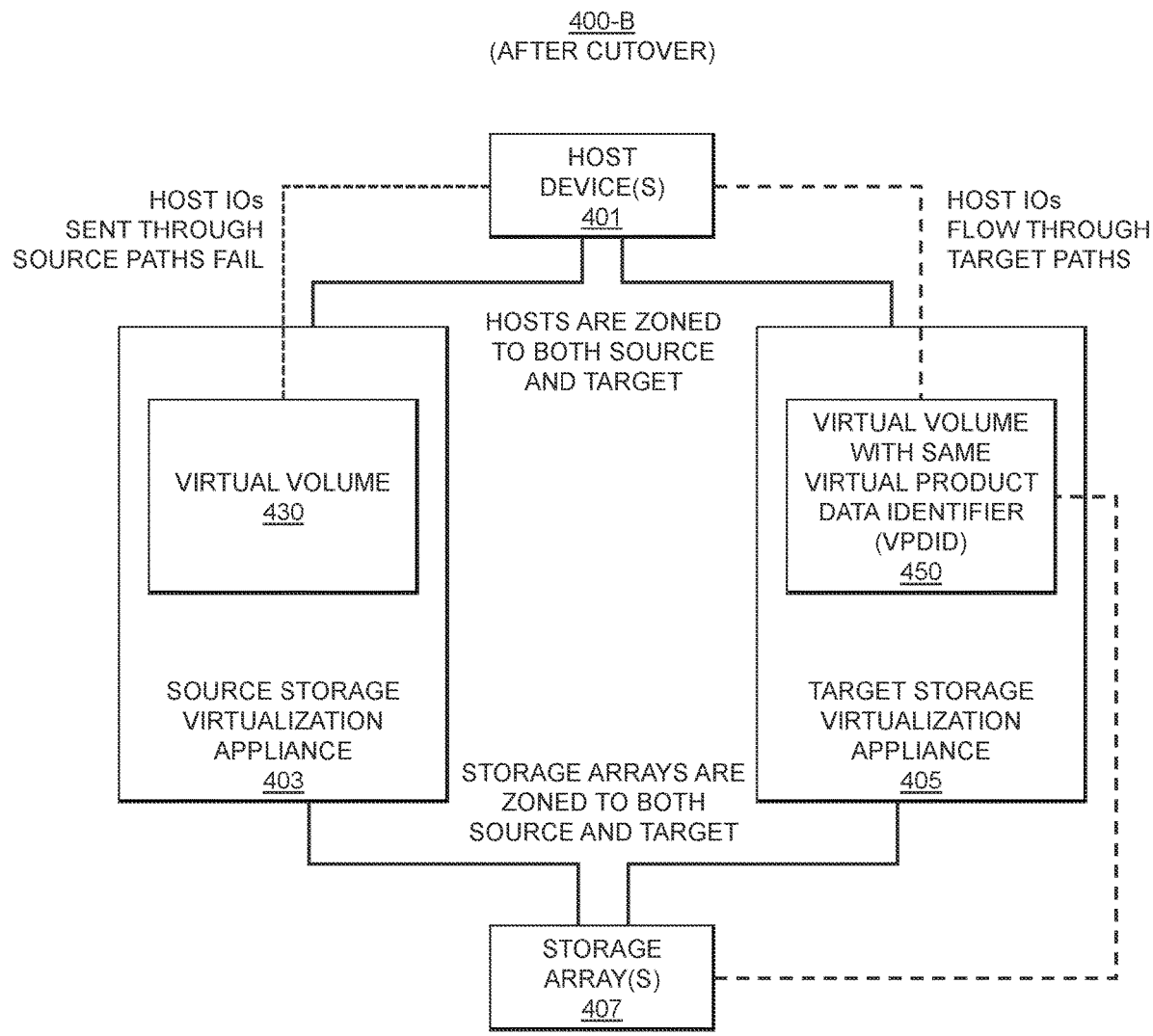

FIGS. 4A and 4B show respective views 400-A and 400-B of a system including one or more host devices 401, a source storage virtualization appliance 403, a target storage virtualization appliance 405, and one or more storage arrays 407, before and after cutover from the source storage virtualization appliance 403 to the target storage virtualization appliance 405. The host devices 401 and the storage arrays 407 are zoned to both the source storage virtualization appliance 403 and the target storage virtualization appliance 405. In the view 400-A shown in FIG. 4A, before cutover, host IOs from the host devices 401 flow through paths including a virtual volume 430 on the source storage virtualization appliance 403. Host IOs from the host devices 401 which are sent to a virtual volume 450 on the target storage virtualization appliance 405 fail (e.g., with 0x5/0x25/0x00 check condition, as the virtual volume 450 is set not ready before cutover). The virtual volume 450 on the target storage virtualization appliance 405 has the same virtual product identifier (VPDID) as the virtual volume 430 on the source storage virtualization appliance 403. In the view 400-B shown in FIG. 4B, after cutover, host IOs from the host devices 401 flow through paths including the virtual volume 450 on the target storage virtualization appliance 405. Host IOs from the host devices 401 which are sent to the virtual volume 430 on the source storage virtualization appliance 403 fail (e.g., with the 0x5/0x25/0x00 check condition, as the virtual volume 430 is set not ready after cutover).

Figure 5A:
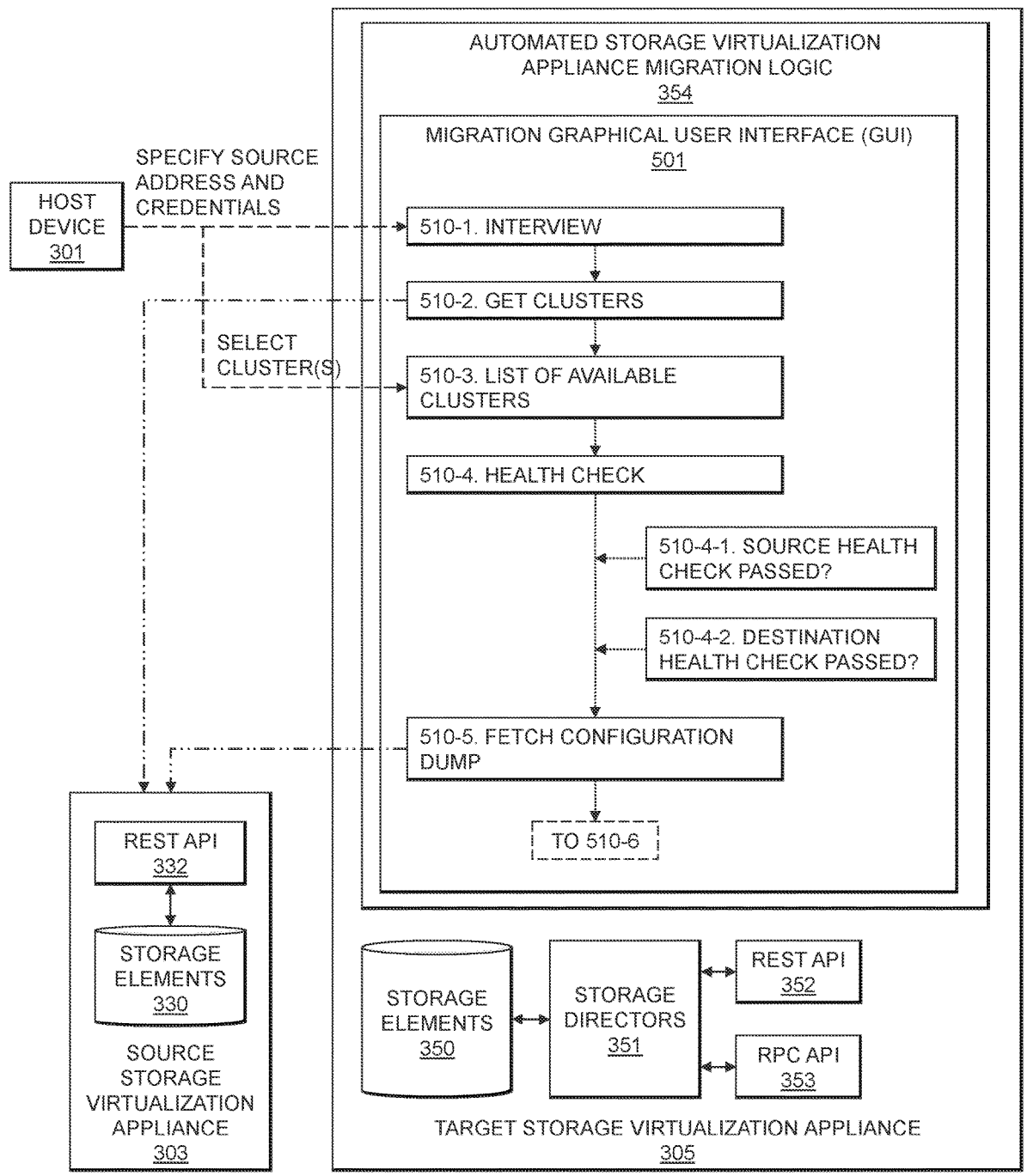
FIGS. 5A-5D shows a graphical user interface process flow for migration between source and target storage virtualization appliances in an illustrative embodiment.

FIGS. 5A-5D show a user workflow for migration involving a migration graphical user interface (GUI) 501 implemented by the automated storage virtualization appliance migration logic 354 on the target storage virtualization appliance 305. As shown in FIG. 5A, the workflow begins with step 510-1, where an interview is conducted and a user of the host device 301 specifies source address (e.g., an IP address) and credentials (e.g., username and password) for the source storage virtualization appliance 303 that hosts one or more virtual volumes to be migrated to the target storage virtualization appliance 305. In step 510-2, a get clusters operation is performed to identify the clusters on the source storage virtualization appliance 303 which are available to be migrated. In step 510-3, the migration GUI 501 outputs a list of the available clusters. The user of the host device 301 selects one or more clusters from the list of available clusters, and then health checks are performed in step 510-4. The health checks may include checks of both the source storage virtualization appliance 303 and the target storage virtualization appliance 305. In steps 510-4-1 and 510-4-2, determinations are made as to whether the source and target/destination health checks passed. If the health checks have passed, then in step 510-5 a configuration dump is fetched from the source storage virtualization appliance 303 (e.g., via a "/config+dump" endpoint on the REST API 332). The workflow then proceeds to step 510-6, shown in FIG. 5B.

Figure 5B:
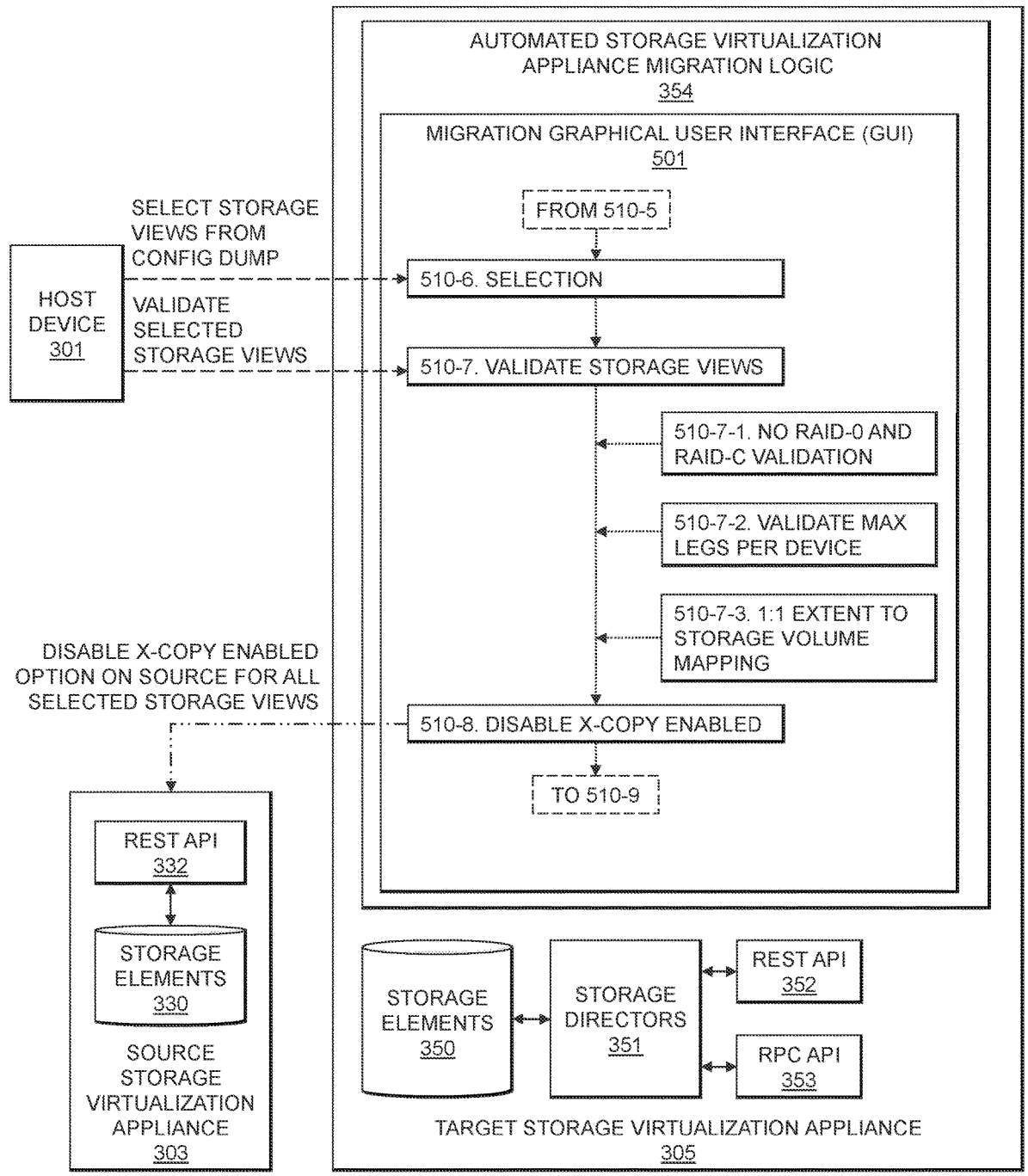

As shown in FIG. 5B, selection is performed in step 510-6 where a user of the host device 301 selects one or more storage views from the configuration dump fetched in step 510-5. In step 510-7, the selected storage views are validated. Such validations may include, for example, validating that there are no RAID-0 or RAID-C volumes on the source storage virtualization appliance 303 that are to be migrated (e.g., assuming that the target storage virtualization appliance 305 does not support RAID-0 or RAID-C) in step 510-7-1. In step 510-7-2, the maximum legs per device is validated, and in step 510-7-3, a 1:1 extent to storage volume mapping is validated for the selected storage views. In step 510-8, an "X-copy enabled" option is disabled on the source storage virtualization appliance 303 for all of the selected storage views. This may utilize an "/nsfw" end point of the REST API 332. The workflow then proceeds to step 510-9, shown in FIG. 5C.

Figure 5C:
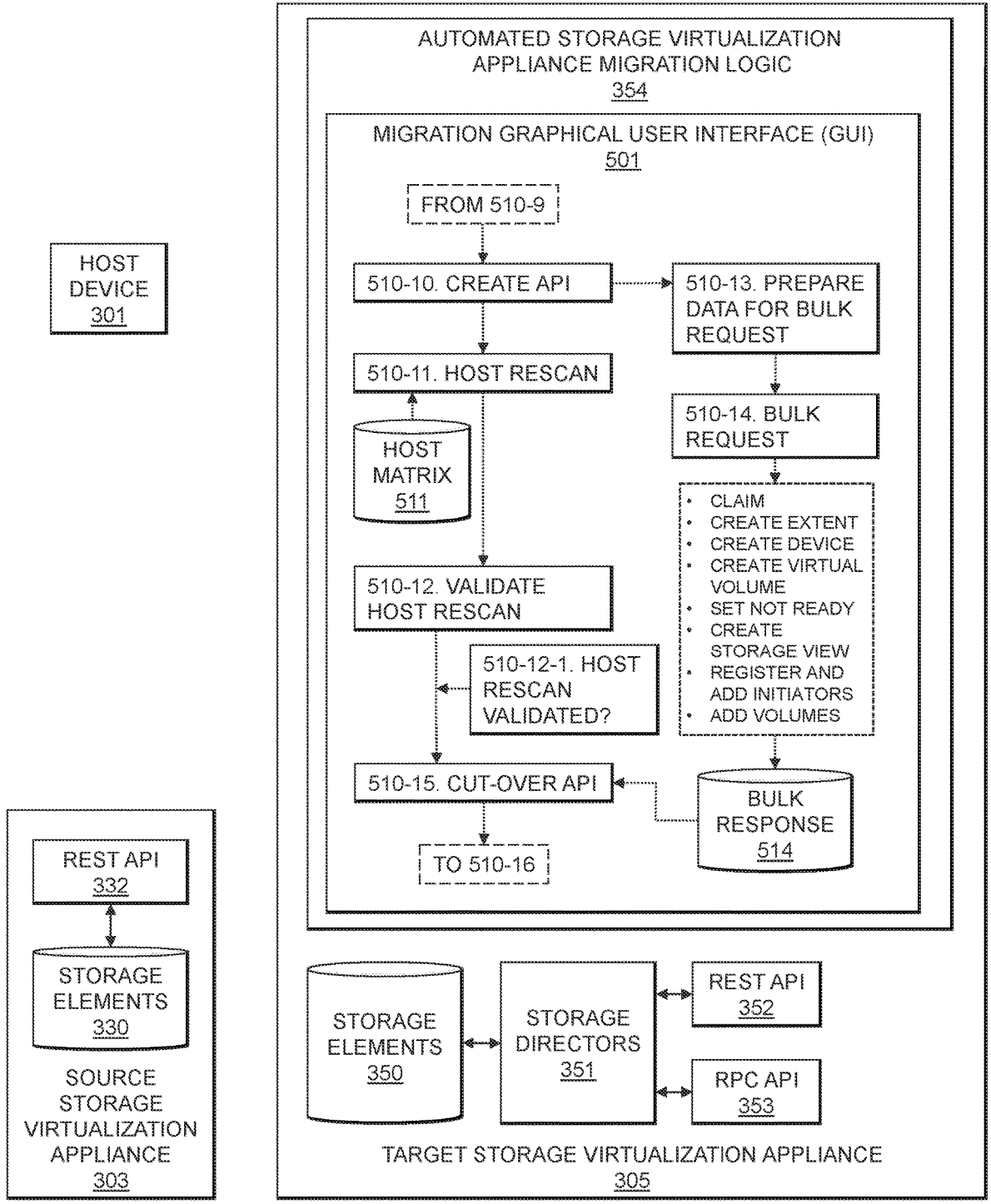

As shown in FIG. 5C, in step 510-10 an API is created, followed by a host rescan operation in step 510-11. The host rescan operation takes as input a host matrix 511. In step 510-12, validation of the host rescan is performed. If the host rescan is validated in step 510-12-1, then processing proceeds to step 510-15 where a cut-over API is initiated. Also following step 510-10, the workflow prepares data for a bulk request in step 510-13 (e.g., using a "/bulk2" end point of the created API). The bulk request is then performed in step 510-14. The bulk request includes claim, create extent, create device, create virtual volume, set not ready, create storage view, register and add initiators, and add volumes operations, resulting in a bulk response 514 which is provided as input for the cut-over API operation in step 510-15. The workflow then proceeds to step 510-16, shown in FIG. 5D.

Figure 5D:
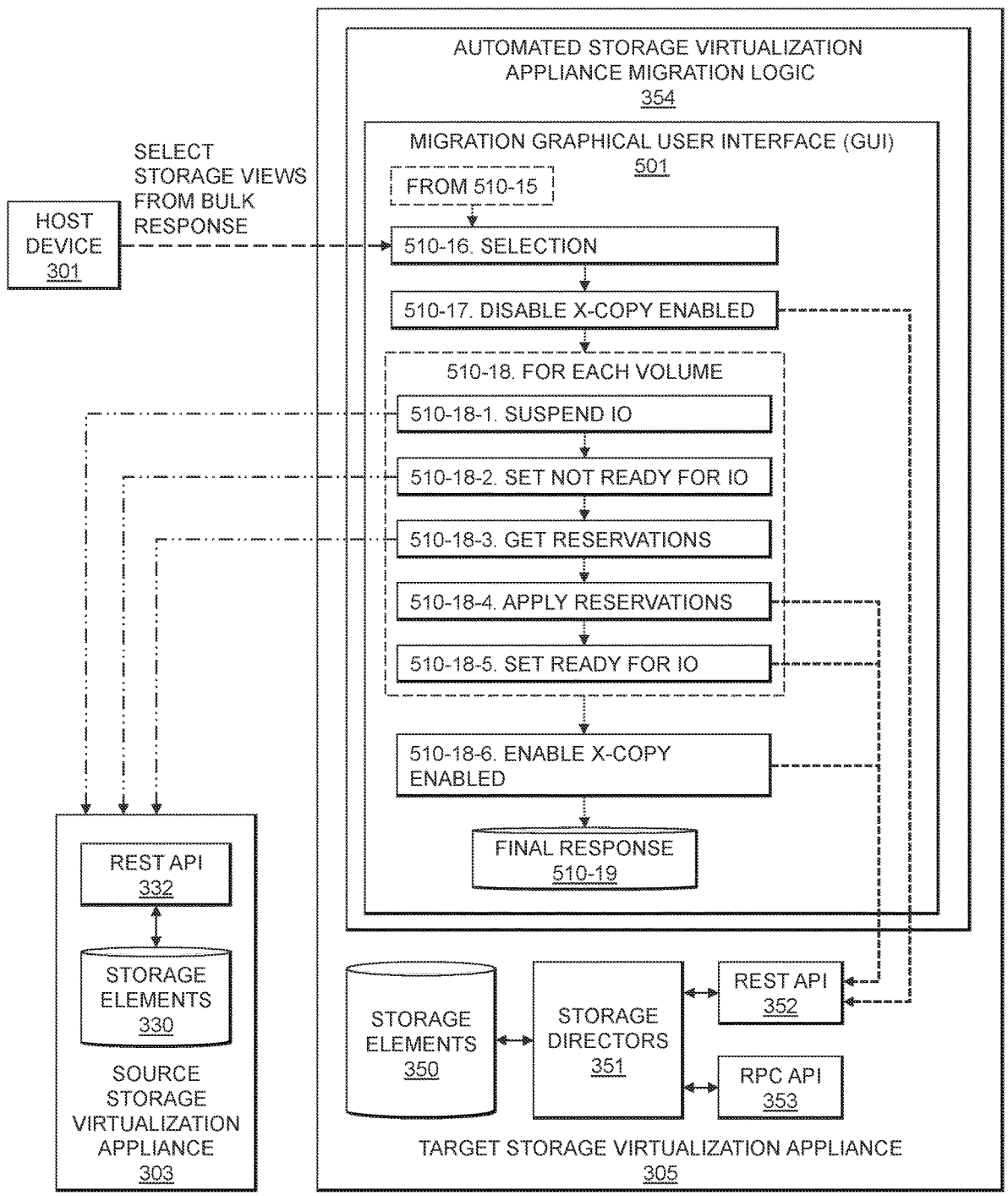

As shown in FIG. 5D, in step 510-16 selection of storage views from the bulk response 514 is performed. In step 510-17, the "X-copy enabled" option is disabled on the target storage virtualization appliance 305 (e.g., using the "/flls end point" of the REST API 352). The workflow then proceeds to processing loop 510-18, which is performed for each volume in the storage views selected in step 510-16. In step 510-18-1, for a given virtual volume, IO is suspended on the source storage virtualization appliance 303 (e.g., using a "/nsfw" end point of the REST API 332). The suspend IO operation may be validated before proceeding. In step 510-18-2, the given virtual volume in the source storage virtualization appliance 303 is set "not ready for IO" (e.g., using a "/nsfw" end point of the REST API 332). The set not ready for IO operation may be validated before proceeding. In step 510-18-3, reservations for the given virtual volume are obtained from the source storage virtualization appliance 303 (e.g., using a "/jsonrpc" end point of the REST API 332). In step 510-18-4, the reservations obtained in step 510-18-3 are applied to the given virtual volume on the target storage virtualization appliance (e.g., using a "/flls" end point of the REST API 352). In step 510-18-5, the given virtual volume on the target storage virtualization appliance 305 is set ready for IO. The set ready for IO operation may be validated before proceeding. The processing of steps 510-18-1 through 510-18-5 is repeated for each virtual volume to be migrated (e.g., as the cut-over is a per volume operation). In step 510-18-6, the "X-copy enabled" option is enabled in the destination storage view on the target storage virtualization appliance 305 (e.g., using a "/flls" end point of the REST API 352). A final response is then output in the migration GUI 501 in step 510-19.

The technical solutions described herein provide various technical advantages, including that migrating customers or other end-users from source to target storage virtualization appliances does not require the source and target storage virtualization appliances to have any interconnections between them. The technical solutions also advantageously provide an out-of-band approach, just requiring that the host devices are zoned to the target storage virtualization appliance, and that thee target storage virtualization appliance is zoned to the same storage arrays to which the source storage virtualization appliance is zoned. Further, the technical solutions enable the entire migration to be performed in multiple migration windows. The technical solutions are designed to be entirely automated, requiring no or minimal manual intervention. The technical solutions described herein thus give customers or other end-users the flexibility to carry out migrations at a storage view level, and also provide the ability for automated roll back in the event of unexpected failures during migration.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated migration of virtual volumes between storage virtualization appliances will now be described in greater detail with reference to FIGS. 6 and 7. Although described in the context of system 100, these platforms may also be used to implement at least portions of other information processing systems in other embodiments.

Figure 6:
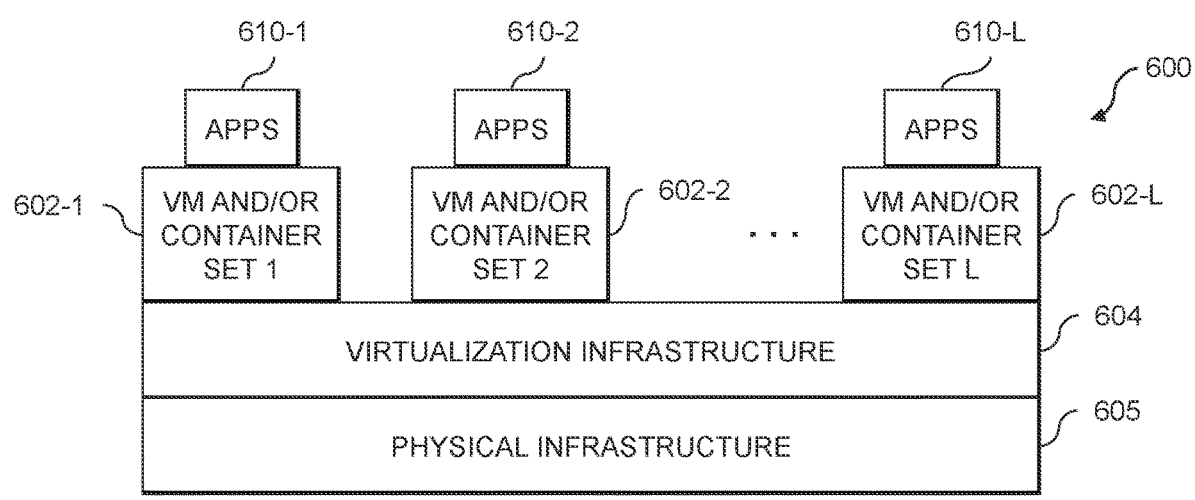
FIGS. 6 and 7 show examples of processing platforms that may be utilized to implement at least a portion of an information processing system in illustrative embodiments.
Figure 7:
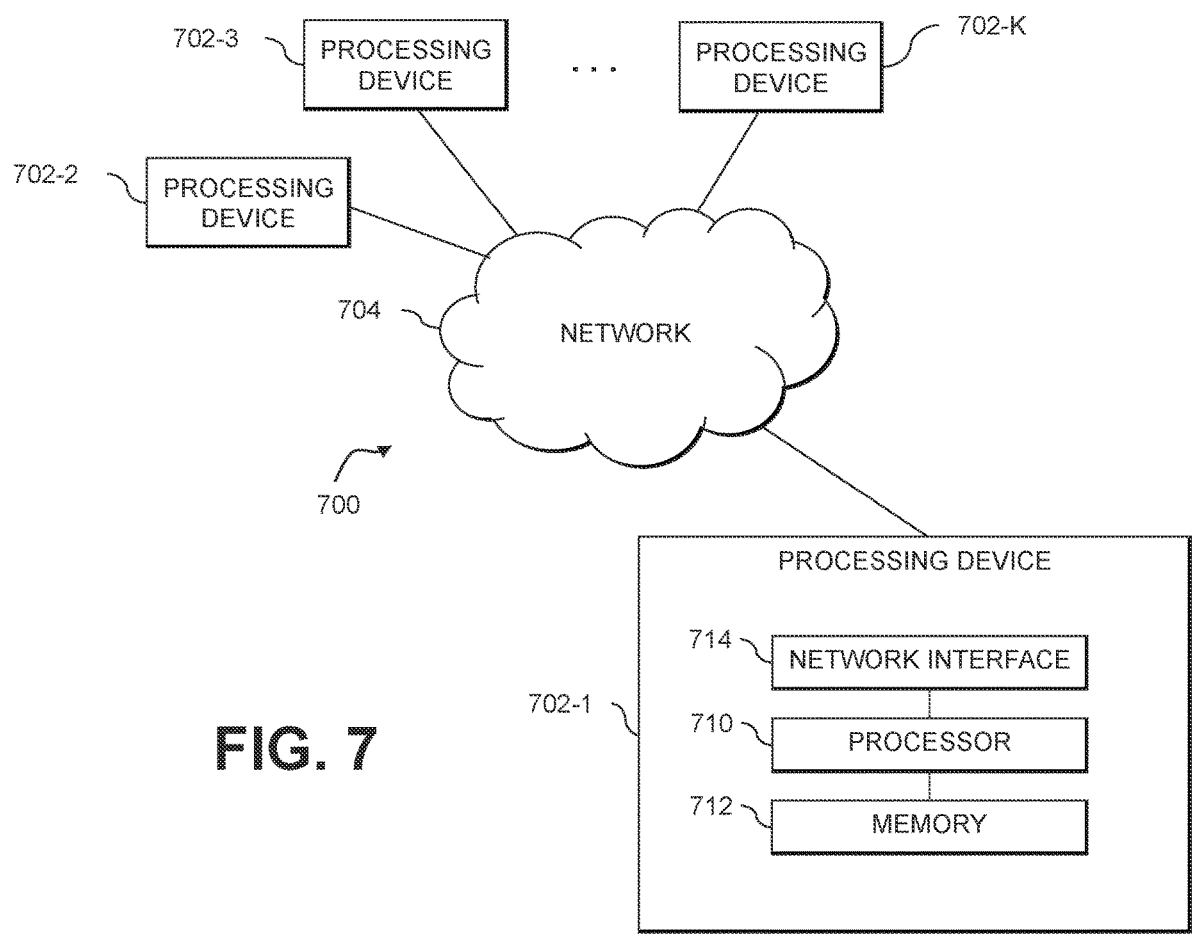

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2 . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2 . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated migration of virtual volumes between storage virtualization appliances as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to select, from a first storage virtualization appliance, one or more virtual volumes to migrate to a second storage virtualization appliance;
   to determine a configuration of a first set of storage elements of the first storage virtualization appliance utilized to implement the selected one or more virtual volumes;
   to provision a second set of storage elements for implementing the selected one or more virtual volumes on the second storage virtualization appliance, the second set of storage elements being provisioned in an inactive state;
   to pause input-output operations directed to the selected one or more virtual volumes on the first set of storage elements of the first storage virtualization appliance;
   to modify (i) the first set of storage elements of the first storage virtualization appliance from an active state to the inactive state and (ii) the second set of storage elements of the second storage virtualization appliance from the inactive state to the active state; and
   to resume input-output operations directed to the selected one or more virtual volumes on the second set of storage elements of the second storage virtualization appliance.

2. The apparatus of claim 1 wherein the first storage virtualization appliance utilizes a first version of storage virtualization software, and wherein the second storage virtualization appliance utilizes a second version of storage virtualization software different than the first version of storage virtualization software.

3. The apparatus of claim 1 wherein the selected one or more virtual volumes comprise all virtual volumes implemented on the first set of storage elements of the first storage virtualization appliance.

4. The apparatus of claim 1 wherein the at least one processing device is further configured to perform health checks of the first storage virtualization appliance and the second storage virtualization appliance responsive to selecting the one or more virtual volumes to migrate to the second storage virtualization appliance.

5. The apparatus of claim 1 wherein provisioning the second set of storage elements for implementing the selected one or more virtual volumes on the second storage virtualization appliance comprises zoning the second storage virtualization appliance to a set of host devices configured to access the selected one or more virtual volumes and one or more backend storage arrays providing underlying storage for the selected one or more virtual volumes.

6. The apparatus of claim 1 wherein provisioning the second set of storage elements for implementing the selected one or more virtual volumes on the second storage virtualization appliance comprises establishing one or more input-output paths between a set of host devices configured to access the selected one or more virtual volumes and the second storage virtualization appliance.

7. The apparatus of claim 1 wherein provisioning the second set of storage elements for implementing the selected one or more virtual volumes comprises creating one or more virtual volumes on the second set of storage elements having a same virtual product identifier as the selected one or more virtual volumes provisioned on the first set of storage elements of the first storage virtualization appliance.

8. The apparatus of claim 1 wherein provisioning the second set of storage elements for implementing the selected one or more virtual volumes comprises determining compatibility of the configuration of the first set of storage elements on the first storage virtualization appliance with the second storage virtualization appliance.

9. The apparatus of claim 8 wherein determining the compatibility of the configuration of the first set of storage elements on the first storage virtualization appliance comprises determining one or more Redundant Array of Independent Disks (RAID) types utilized by the selected one or more virtual volumes implemented on the first set of storage elements of the first storage virtualization appliance.

10. The apparatus of claim 9 wherein, responsive to determining that the selected one or more virtual volumes implemented on the first set of storage elements of the first storage virtualization appliance utilize RAID-0, converting the selected one or more virtual volumes from utilizing RAID-0 to utilizing RAID-1.

11. The apparatus of claim 8 wherein determining the compatibility of the configuration of the first set of storage elements on the first storage virtualization appliance comprises verifying a one-to-one extent to storage volume mapping for the selected one or more virtual volumes and underlying storage on one or more backend storage arrays.

12. The apparatus of claim 1 wherein modifying (i) the first set of storage elements of the first storage virtualization appliance from the active state to the inactive state and (ii) the second set of storage elements of the second storage virtualization appliance from the inactive state to the active state comprises:
  determining one or more Small Computer Systems Interface (SCSI) reservations for the selected one or more virtual volumes on the first storage virtualization appliance; and
  applying the determined one or more SCSI reservations for the selected one or more virtual volumes on the second storage virtualization appliance.

13. The apparatus of claim 1 wherein the active state comprises a ready for input-output state and the inactive state comprises a not ready for input-output state.

14. The apparatus of claim 1 wherein the at least one processing device is further configured to remove the selected one or more virtual volumes from the first set of storage elements on the first storage virtualization appliance responsive to resuming input-output operations directed to the selected one or more virtual volumes on the second set of storage elements of the second storage virtualization appliance.

15. A computer program product comprising a non-transitory processor-readable storage medium having stored therein program code of one or more software programs, wherein the program code when executed by at least one processing device causes the at least one processing device:
  to select, from a first storage virtualization appliance, one or more virtual volumes to migrate to a second storage virtualization appliance;
  to determine a configuration of a first set of storage elements of the first storage virtualization appliance utilized to implement the selected one or more virtual volumes;
  to provision a second set of storage elements for implementing the selected one or more virtual volumes on the second storage virtualization appliance, the second set of storage elements being provisioned in an inactive state;
  to pause input-output operations directed to the selected one or more virtual volumes on the first set of storage elements of the first storage virtualization appliance;
  to modify (i) the first set of storage elements of the first storage virtualization appliance from an active state to the inactive state and (ii) the second set of storage elements of the second storage virtualization appliance from the inactive state to the active state; and
  to resume input-output operations directed to the selected one or more virtual volumes on the second set of storage elements of the second storage virtualization appliance.

16. The computer program product of claim 15 wherein the first storage virtualization appliance comprises a first version of storage virtualization software, and wherein the second storage virtualization appliance utilizes a second version of storage virtualization software different than the first version of storage virtualization software.

17. The computer program product of claim 15 wherein the selected one or more virtual volumes comprise all virtual volumes implemented on the first set of storage elements of the first storage virtualization appliance.

18. A method comprising:
  selecting, from a first storage virtualization appliance, one or more virtual volumes to migrate to a second storage virtualization appliance;
  determining a configuration of a first set of storage elements of the first storage virtualization appliance utilized to implement the selected one or more virtual volumes;
  provisioning a second set of storage elements for implementing the selected one or more virtual volumes on the second storage virtualization appliance, the second set of storage elements being provisioned in an inactive state;

pausing input-output operations directed to the selected one or more virtual volumes on the first set of storage elements of the first storage virtualization appliance;

modifying (i) the first set of storage elements of the first storage virtualization appliance from an active state to the inactive state and (ii) the second set of storage elements of the second storage virtualization appliance from the inactive state to the active state; and resuming input-output operations directed to the selected one or more virtual volumes on the second set of storage elements of the second storage virtualization appliance;

wherein the method is performed by at least one processing device comprising a processor coupled to a memory.

19. The method of claim 18 wherein the first storage virtualization appliance comprises a first version of storage virtualization software, and wherein the second storage virtualization appliance utilizes a second version of storage virtualization software different than the first version of storage virtualization software.

20. The method of claim 18 wherein the selected one or more virtual volumes comprise all virtual volumes implemented on the first set of storage elements of the first storage virtualization appliance.

* * * * *